（12）United States Patent
Ma et al.

(10) Patent No.: US 11,459,870 B2
(45) Date of Patent: Oct. 4, 2022

(54) 1-D INVERSION PROCESS FOR DETERMINING FORMATION PROPERTIES AHEAD OF A DRILL BIT IN A SUBSURFACE FORMATION

(71) Applicant: Halliburton Energy Services, Inc., Houston, TX (US)

(72) Inventors: Jin Ma, Houston, TX (US); Michael S Bittar, Houston, TX (US); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 393 days.

(21) Appl. No.: 16/477,484

(22) PCT Filed: Aug. 22, 2018

(86) PCT No.: PCT/US2018/047540
§ 371 (c)(1),
(2) Date: Jul. 11, 2019

(87) PCT Pub. No.: WO2020/040758
PCT Pub. Date: Feb. 27, 2020

(65) Prior Publication Data
US 2021/0340853 A1 Nov. 4, 2021

(51) Int. Cl.
*E21B 44/00* (2006.01)
*E21B 47/13* (2012.01)
(Continued)

(52) U.S. Cl.
CPC ............ *E21B 44/00* (2013.01); *E21B 47/04* (2013.01); *E21B 47/13* (2020.05); *E21B 49/003* (2013.01);
(Continued)

(58) Field of Classification Search
None
See application file for complete search history.

(56) References Cited

U.S. PATENT DOCUMENTS

| 8,264,228 | B2 | 9/2012 | Bittar et al. |
| 8,862,405 | B2 | 10/2014 | Seydoux et al. |

(Continued)

FOREIGN PATENT DOCUMENTS

| CN | 105510984 A | * | 4/2016 | |
| GB | 2492992 A | * | 1/2013 | ............... G01V 3/20 |

(Continued)

OTHER PUBLICATIONS

PCT Application Serial No. PCT/US2018/047540, International Written Opinion, dated May 21, 2019, 7 pages.
(Continued)

*Primary Examiner* — Lina M Cordero
(74) *Attorney, Agent, or Firm* — Delizio, Peacock, Lewin & Guerra

(57) ABSTRACT

One or more first formation measurements sensitive to around a sensor string of a drill string deployed in a subsurface formation is received, A 1-D inversion of the first formation measurements is performed at a first reference point. One or more second formation measurements sensitive to ahead of a drill bit of the drill string deployed in the subsurface formation is received. A 1-D inversion of the second formation measurements is performed at a second reference point ahead of the drill bit of the sensor string to determine formation properties ahead of the drill bit, wherein the 1-D inversion of the second formation measurements is based on inversion results associated with the 1-D inversion of the first formation measurements.

17 Claims, 10 Drawing Sheets

(51) Int. Cl.
  *E21B 47/04* (2012.01)
  *E21B 49/00* (2006.01)
  *G01V 3/28* (2006.01)
  *G01V 3/34* (2006.01)
  *G01V 3/38* (2006.01)
  *E21B 7/04* (2006.01)

(52) U.S. Cl.
  CPC .................. *G01V 3/28* (2013.01); *G01V 3/34* (2013.01); *G01V 3/38* (2013.01); *E21B 7/04* (2013.01)

(56) References Cited

U.S. PATENT DOCUMENTS

| | | |
|---|---|---|
| 2013/0144529 A1 | 6/2013 | Seydoux et al. |
| 2013/0191028 A1 | 7/2013 | Homan et al. |
| 2013/0289880 A1 | 10/2013 | Gorek |
| 2014/0249754 A1 | 9/2014 | Donderici et al. |
| 2015/0015265 A1 | 1/2015 | Seydoux et al. |
| 2016/0245952 A1* | 8/2016 | Dupuis .................... G01V 3/08 |
| 2017/0322339 A1 | 11/2017 | Wessling et al. |
| 2019/0346584 A1* | 11/2019 | Wu ........................ E21B 47/026 |
| 2021/0041590 A1* | 2/2021 | Tang ........................ G01V 3/38 |
| 2021/0055448 A1* | 2/2021 | Thiel ........................ E21B 47/13 |

FOREIGN PATENT DOCUMENTS

| | | | | |
|---|---|---|---|---|
| WO | WO-2016108913 A1 * | 7/2016 | ............. | E21B 7/022 |
| WO | WO-2018144035 A1 * | 8/2018 | ............... | G01V 3/18 |
| WO | 2018067112 A1 | 12/2018 | | |

OTHER PUBLICATIONS

PCT Application Serial No. PCT/US2018/047540, International Search Report, dated May 21, 2019, 5 pages.

\* cited by examiner

1-D INVERSION PROCESS FOR DETERMINING FORMATION PROPERTIES AHEAD OF A DRILL BIT IN A SUBSURFACE FORMATION

TECHNICAL FIELD

The disclosure generally relates to earth or rock drilling (mining), and more particularly to determining formation properties ahead of a drill bit during drilling of a subsurface formation.

BACKGROUND

Maximizing hydrocarbon production in a subsurface formation involves locating hydrocarbons and then steering a drill bit in a direction where the hydrocarbons are located. To facilitate the steering, sensors are placed on a drill string which terminates with a drill bit. The sensors utilize electromagnetic signals to make deep and shallow measurements in the subsurface formation. The deep measurements are long range measurements made at a low resolution and the shallow measurements are short range measurements made at a high resolution. The measurements are processed to determine formation properties around the drill string and ahead of the drill bit. The drill bit may be then steered to either remain in a formation layer which produces hydrocarbons or be directed to another formation layer to increase production of hydrocarbons.

BRIEF DESCRIPTION OF THE DRAWINGS

Embodiments of the disclosure may be better understood by referencing the accompanying drawings.

DESCRIPTION OF EMBODIMENTS

Figure 1:
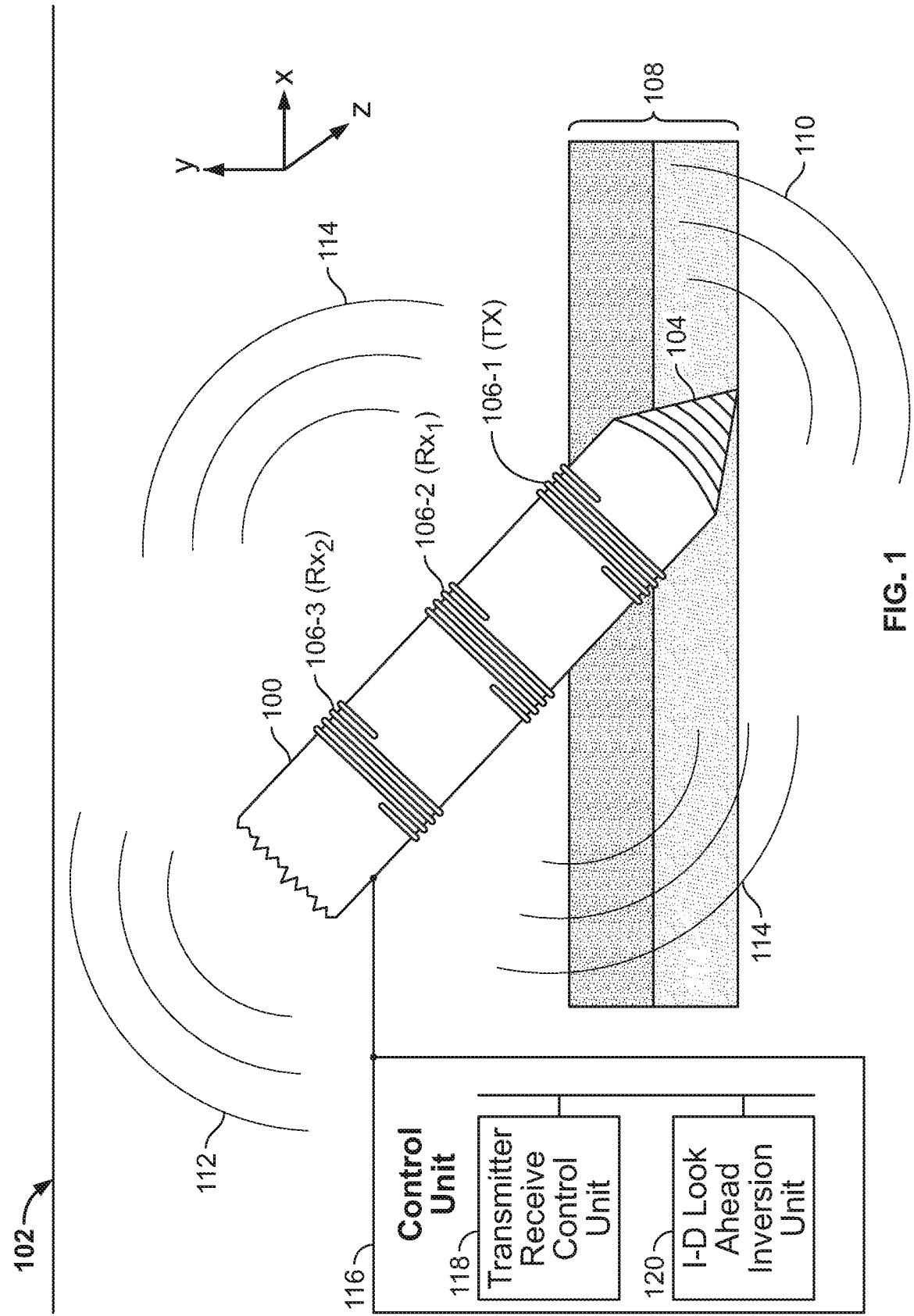
FIG. 1 illustrates sampling tools on a drill string arranged to determine multi-layer formation properties ahead of a drill bit.

The description that follows includes example systems, methods, techniques, and program flows that embody embodiments of the disclosure. However, it is understood that this disclosure may be practiced without these specific details. For instance, this disclosure refers to a 1-D inversion process for determining multi-layer formation properties ahead of a drill bit in illustrative examples. Aspects of this disclosure can be applied to applications other than in a drilling context. In other instances, well-known instruction instances, protocols, structures and techniques have not been shown in detail in order not to obfuscate the description.

Overview

Embodiments described herein are directed to determining formation properties in a subsurface formation ahead of a drill bit based on 1-D inversions rather than more computationally complex 2-D inversions. The formation properties are determined based on measurements performed by one or more sensors located behind the drill bit on a drill string.

A first sensor of the one or more sensors associated with the drill string may include a transmitter/receiver pair arranged to perform shallow formation measurements. The shallow formation measurements are inverted using a 1-D inversion to determine shallow formation properties at a reference point behind the drill bit (e.g., shallow layer inversion). The shallow formation properties that are determined may include one or more of horizontal and vertical resistivity, upper and lower formation boundary positions, boundary dip angle, and anisotropy associated with a multi-layer formation.

A second sensor of the one or more sensors associated with the drill string may include a transmitter/receiver pair sensitive to deep formation properties around the drill string and formation boundaries. Measurements from the transmitter/receiver pair may be inverted using a 1-D inversion while the shallow formation properties and/or shallow formation measurements are used as constraints in the inversion process. The 1-D inversion determines deep formation properties around the reference point (e.g., deep layer inversion).

A third sensor of the one or more sensors associated with the drill string may include a transmitter/receiver pair sensitive to deep formation properties ahead of the drill bit and formation boundaries. The reference point is shifted ahead of the drill bit and measurements from the transmitter/receiver pair may be inverted using a 1-D inversion while shallow and deep formation properties around the drill bit at the reference point behind the drill bit are used as constraints in the inversion process. The 1-D inversion determines formation properties at the shifted reference point (e.g., look ahead inversion).

Additional formation properties may be determined for an intermediate point between the reference point behind the drill bit and the shifted reference point. In one example, the measurements input into the shallow layer inversion, deep layer inversion, and look ahead inversion may be weighed based on depth distances between the reference point behind the drill bit or the reference point ahead the drill bit relative to an intermediate point to estimate measurements at the intermediate point. The weighted measurements may be then inverted to determine the formation properties at the intermediate point. In another example, the formation properties associated with the shallow layer inversion, deep layer inversion, and look ahead inversion may be weighted based on depth distances between the reference point behind the drill bit or reference point ahead the drill bit relative to an intermediate point to estimate the formation properties at the intermediate point. The formation properties at all points are combined to form an inversion canvas illustrating formation properties around and ahead of the drill bit which can be used to steer the drill bit in the formation.

Example Illustrations

Illustrative embodiments and related methodologies of the present disclosure are described below in reference to the examples shown in FIGS. 1-10 as they might be employed, for example, in the context of a 1-D inversion process for determining formation properties ahead of a drill bit when drilling for hydrocarbons in a subsurface formation. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of determining formation properties in a downhole environment, it should be appreciated that the generation is not intended to be limited thereto and that these techniques may be applied in other contexts as well.

FIG. 1 illustrates a drill string 100 arranged in a subsurface formation 102 to determine formation properties ahead of a drill bit 104. Drill string 100 may include, but is not limited to, drill pipe and coiled tubing, as generally known to those skilled in the art. The drill bit 104 may crush or cut rock, be attached to the distal end of drill string 100 and be driven either by a downhole motor and/or via rotation of drill string 100. Without limitation, drill bit 104 may include, roller cone bits, PDC bits, natural diamond bits, any hole openers, reamers, coring bits, and the like. As drill bit 104 rotates, it may create and extend wellbore that penetrates various subterranean formations. Logging tools 106 may take the form of very deep reading (VDR) sensors with one or more transmitters 106-1 for generating electromagnetic fields and/or one or more receivers 106-2, 106-3 for receiving the electromagnetic fields. In the drill string 100, the transmitter 106-1 may be located behind a drill bit 106 in a direction of drilling (conversely the drill bit may be located ahead of the transmitter in a direction of drilling) while the one or more receivers 106-2, 106-3 may be located behind the transmitter 106-1 and spaced a given distance away. In other examples, the receiver may be located ahead of the transmitter and closest to the drill bit 104.

The transmitters 106-1 and receivers 106-2, 106-3 may take the form of one or more antennas such as coils of a conductive material such as copper wire. Large spacings between a transmitter which transmits a signal and a receiver which receives the signal (i.e., transmitter/receiver pair) may be selected to make deep measurements in layers 108 of the formation 102. A layer in the formation may be a region of the formation 102 with similar formation properties such as resistivity, conductivity, gamma, porosity etc. Smaller spacings between a transmitter which transmits a signal and a receiver which receives the signal (i.e., transmitter/receiver pair) may be selected to make shallow measurements in the layers 108 of the formation 102. For example, shallow measurements may include contributions from regions about one inch to about 20 ft from the drill string and deep measurements may include contributions from regions about 5 ft (or 150 cm) to about 200 ft (or 60 meters) from the drill string.

The arrangement of the transmitter and receivers may facilitate making various types of measurements in the formation 102. For example, measurements may be sensitive to formation properties in a region ahead of the drill bit (e.g., look ahead measurements 110) and behind the drill bit (e.g., look behind measurements 112). The measurements may have sensitivity generally along a Z axis associated with a drilling direction. As another example, the measurements may be sensitive to formation properties in a region around the drill string 102 (e.g., look around measurements 114). The measurements may have sensitivity generally along an X and Y direction orthogonal to the Z direction.

The one or more sampling tools may be associated with a control unit 116 coupled to the transmitters and receivers 106 of the drill string 102. The control unit 116 may be located below the surface as shown or at a surface of the formation and arranged to communicate with the transmitter and/or receivers 104-1, 104-2, and 104-3 via a wired (e.g., fiber optic) or wireless connection.

The control unit 116 may have a transmit/receive control unit 118 for controlling activation and deactivation of the transmitters and receivers. The transmit/receive control unit 118 may be operable to activate a single transmitter to transmit a signal and activate a single receiver to receive the signal to form a sensor. For example, the transmit control may define the signal that is transmitted by the transmitter including a voltage and duration of the signal and the receiver control may receive the signal from the receiver.

Additionally, the control unit 116 may have a 1-D look ahead inversion unit 120 which processes the signal received from the receiver. Inversion is a process of comparing measurements to predictions of the measurements based on a model such that a physical property at a reference point can be determined as a function of depth. In the context of determining formation properties, a 1-D inversion process may involve determining layered formation properties at a reference point in the formation 102 as the function of depth based on a model of the formation 102 and measurements made in the formation. In this regard, the look ahead measurements 110, look around measurements 114, and look behind measurements 112 made by the transmitter and/or receivers 104 may serve as input into the 1-D look ahead inversion unit 120 which performs one or more 1-D inversions to determine multi-layer formation properties ahead of the bit. For example, the look around measurements may serve as an input to a 1-D inversion to determine formation properties around the drill string 100 and the look ahead measurements and the determined formation properties around the drill string 100 may serve as input into another 1-D inversion to determine formation properties ahead of the drill bit 104. The formation properties may include horizontal resistivity (Rh) or conductivity (sh=1/Rh), vertical resistivity (Rv) or conductivity (sv=1/Rh), upper boundary and/or lower boundary position of a formation layer, boundary dip angle, and/or anistropy (Rv/Rh) a function of depth. The sequencing of 1-D inversions to determine formation properties ahead of the drill bit 104 may be less computationally complex than performing a 2-D inversion of look ahead and look around measurements to determine formation properties ahead of the drill bit 104.

The antenna of transmitter or receiver may be oriented in various directions to facilitate making the look ahead, look behind, and/or look around measurements used in the 1-D inversion process. The orientations of the antenna of the transmitter and/or receiver may include an X, Y, or Z direction or tilted angle.

Figure 2A:
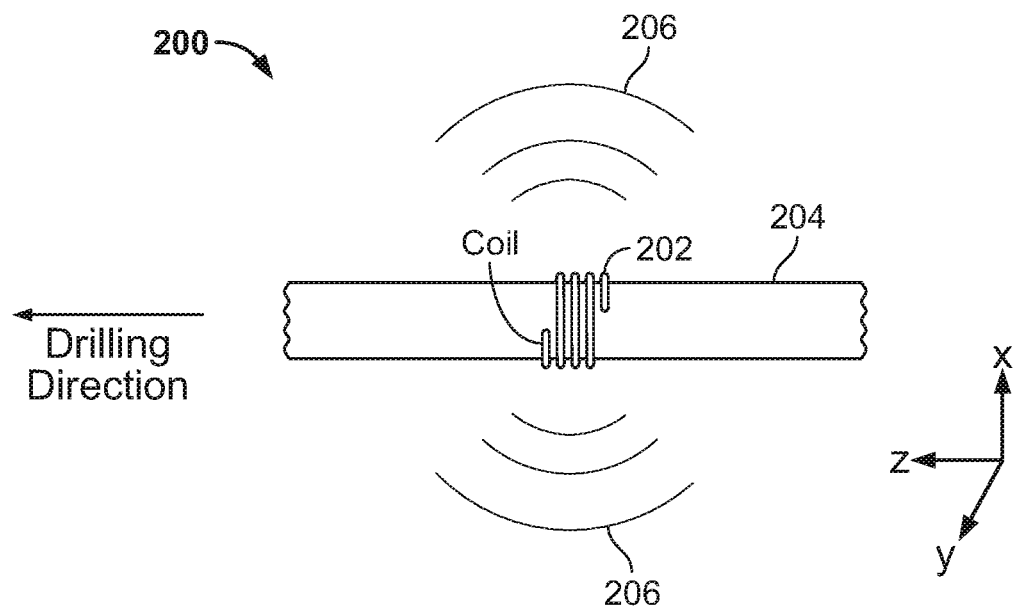
FIGS. 2A, 2B, and 2C illustrate example antenna field patterns.

FIG. 2A illustrates an example orientation 200 of an antenna in the form of a coil antenna 202 oriented in a coaxial direction with respect to a portion of drill string 204. When the coil antenna 202 is oriented in the coaxial direction, the coil antenna 202 may produce electromagnetic field patterns 206 (i.e., a magnetic dipole) generally around the drill string 204 in the X and Y directions.

Figure 2B:
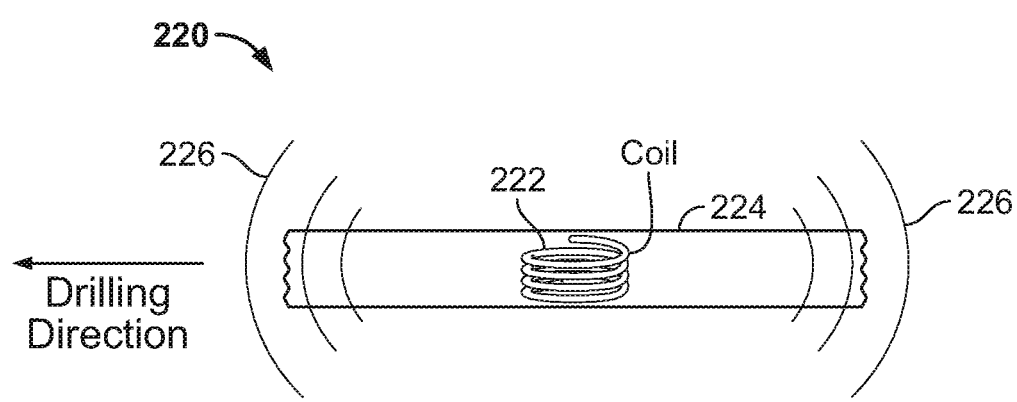

FIG. 2B illustrates an example orientation 220 of an antenna in the form of a coil antenna 222 oriented in the axial direction (either X or Y direction) with respect to a portion of drill string 224. When the coil antenna 222 is oriented in the axial direction, the coil antenna 222 may produce electromagnetic field patterns 226 (i.e., a magnetic dipole) ahead of and/or behind the drill string 324 in the Z direction.

Figure 2C:
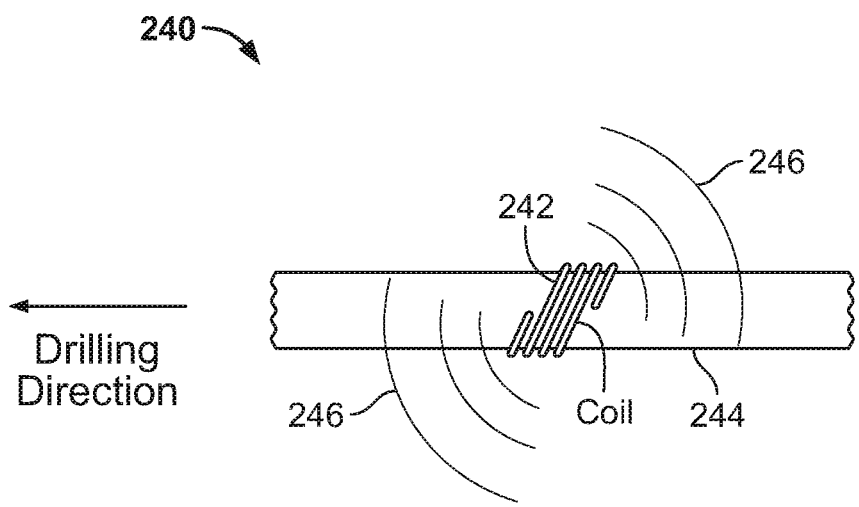

FIG. 2C illustrates an example orientation 240 of an antenna in the form of a coil antenna 242 oriented in a tilted coaxial direction with respect to a portion of drill string 244. When the coil antenna 242 is oriented in the axial direction, the coil antenna 242 may produce electromagnetic field patterns 246 (i.e., a magnetic dipole) at an angle ahead of and/or behind the drill string 244.

The one or more transmitters and receivers of the drill string may form a sensor string. For example, the sensor string may be arranged with one transmitter closest to the drill bit and one or more receiver spaced further away from the transmitter where a transmitter/receiver pair defines a sensor.

Sensitivity for a volume v at a position r may be defined by:

$$S(\vec{r}) = \int_{\Delta_v} \vec{E}_{transmitter}(\vec{r}) \cdot \vec{E}_{receiver}(\vec{r}) dv$$

where $E_{transmitter}$ and $E_{receiver}$ define the electric field of the transmitter and receiver at a location r integrated over the volume v of the formation. The sensitivity calculation may be used to determine how to orient the coil antenna of a receiver with respect to the coil antenna of a transmitter so that the sensors are sensitive to formation properties ahead of the drill bit and/or around the drill string. High sensitivity may indicate an ability to determine formation properties in the volume while low sensitivity may indicate an inability to determine formation properties in the volume. In this regard, the sensitivity may facilitate determining an orientation of the coil antenna of the transmitter and receiver for performing look ahead measurements, look behind measurements, and/or look around measurement.

Figure 3A:
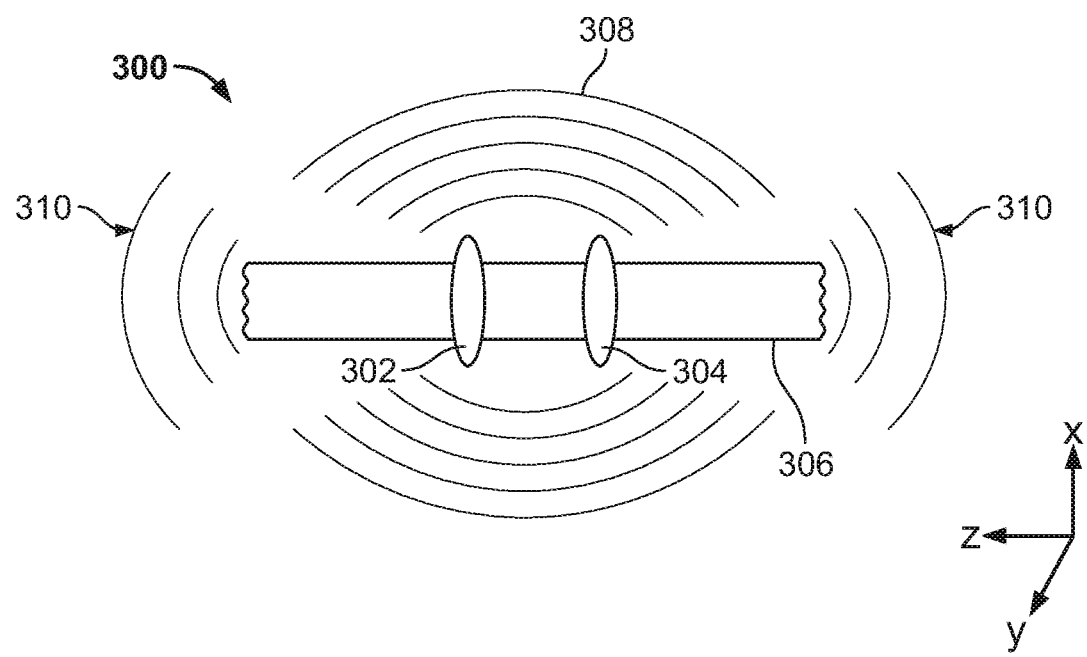
FIGS. 3A and 3B illustrate example sensitivities of transmitter/receiver pairs.

FIG. 3A illustrates sensitivity 300 when a transmitter 302 and receiver 304 are oriented in a Z direction, e.g., the transmitter and receiver antenna coils are coaxially located along a drill string 306. Close field patterns 308 may indicate high sensitivity while far field patterns 310 may indicate weaker sensitivity. As shown, close field patterns 308 are around the drill string 306 and does not extend much ahead or behind the drill string 306. In this regard, a Z oriented transmitter and a Z oriented receiver, referred to as ZZ components, results in sensitivity to formation properties around a sensor string (i.e., the transmitter 302 and receiver 304 on the drill string 306)

Figure 3B:
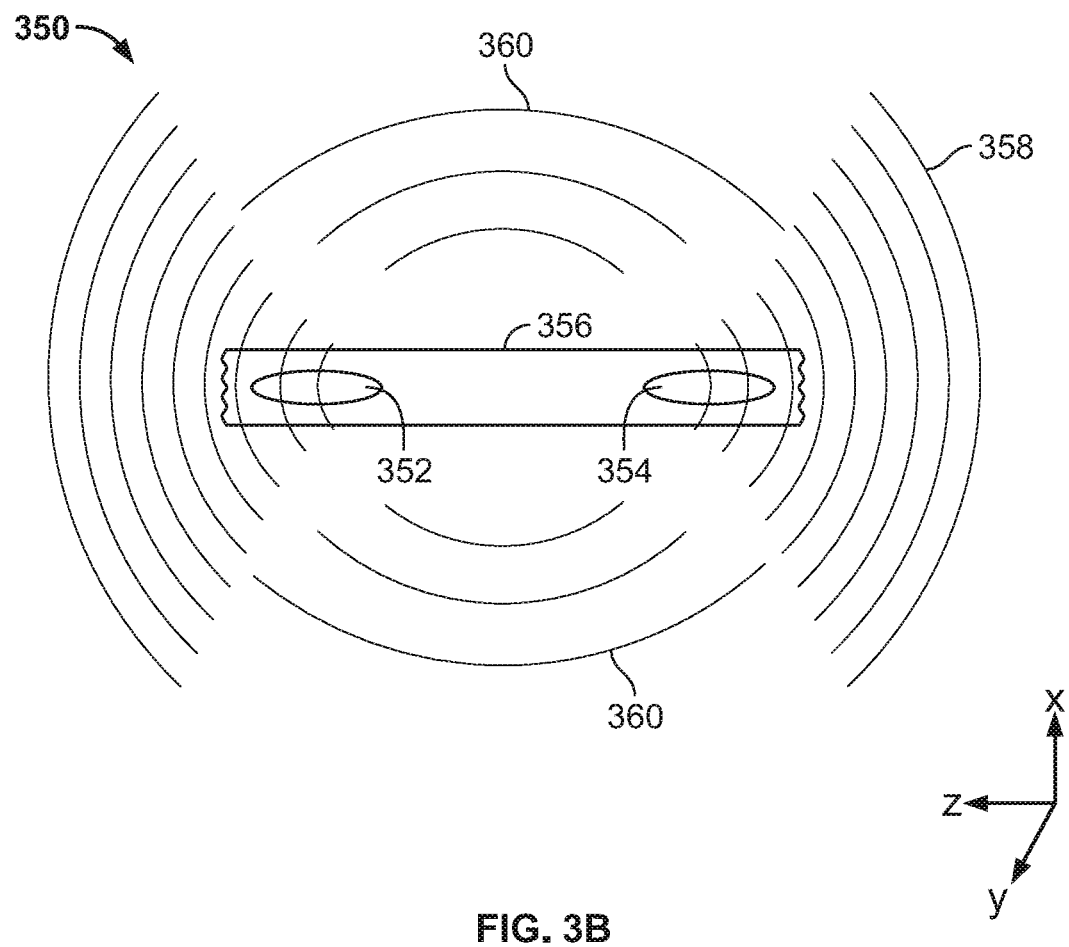

FIG. 3B illustrates sensitivity 350 when a transmitter 352 and receiver 354 are oriented in a X direction, e.g., the transmitter and receiver antenna coils are axially located along a drill string 356. As shown, close field patterns 358 extend ahead or behind the drill string while far field patterns 360 do not extend much around the drill string 356. In this regard, an X oriented transmitter and a X oriented receiver, referred to as XX component, results in sensitivity to formation properties ahead of or behind a sensor string (i.e., the transmitter 352 and receiver 354 on the drill string 356).

Sensitivities associated with various combinations of transmitter and receiver orientations may be analyzed to determine optimal orientations of the antennas associated with transmitter receiver pairs to perform look around, look ahead/behind, and formation boundary measurements. As illustrated above, transmitter and receiver pairs oriented in the Z direction may have sensitivity ahead and behind the sensor string. The ZZ component may be used to make measurements ahead and behind the sensor string. Similarly, transmitter and receiver pairs oriented in the X-Y direction may have sensitivity around the sensor string. The XX and YY component may be used to make measurements around the sensor string. A transmitter oriented in a Z direction while the receiver is oriented in an X direction (and vice versa) may be sensitive to approaching formation boundaries. The XZ and ZX component may be used to make measurements at formation boundaries. The table below summarizes the sensitivity of measurements for different example orientations of a transmitter and receiver:

| Transmitter-Receiver Pair | Sensitivity |
| --- | --- |
| XX | Ahead/behind the sensor string |
| YY | Ahead/behind the sensor string |
| ZZ | Around the sensor string |
| XZ | Formation boundaries |
| ZX | Formation boundaries |

The first variable of the transmitter-receiver pair may represent an orientation of the antenna, e.g., coil antenna, of the transmitter. The second variable of the transmitter-receiver pair may represent an orientation of the antenna. e.g., coil antenna, of the receiver. For example, XX components may represent a transmitter and receiver oriented in the X direction and resulting sensitivity ahead/behind the sensor tool to make measurements ahead and behind the drill string. As another example, ZX components may represent a transmitter oriented in the Z direction and a receiver oriented in the X direction. The sensitivity may be indicative of a cross coupling between the transmitter and receiver oriented in the Z and X directions respectively and resulting sensitivity to formation boundaries.

In this regard, measurements with a desired sensitivity may be performed by arranging a transmitter with an antenna having a given orientation and receiver having an antenna with a given orientation so that the transmitter/receiver pair has the desired sensitivity when performing measurements. The arrangement may be performed by selection of the transmitter to transmit an electromagnetic wave and selection of the receiver to receive the electromagnetic wave. The transmit/receive control module may be used to make this selection.

In other arrangements, tilted antennas may be used to obtain measurements with desired sensitivity. One or more of the transmitter and receiver may have an antenna which is tilted in a coaxial direction and/or axial direction such that when the drill string rotates the transmitter/receiver pair may be arranged equivalent to one or more of ZZ, XX, YY, ZX, and/or XZ components at a given instant. By well-known signal processing techniques, the measurements associated with each of the components may be decoupled from an aggregate measurement to obtain a given measurement associated with given sensitivity. For example, measurements associated with the ZZ. XX, YY ZX, and/or XZ components may be decoupled from the aggregate measurements performed by the transmitter and receiver rotating around the drill string. In this regard, the transmitter and receivers may not need to be specifically oriented in the axial or coaxial directions to obtain measurements with the desired sensitivity.

Figure 4:
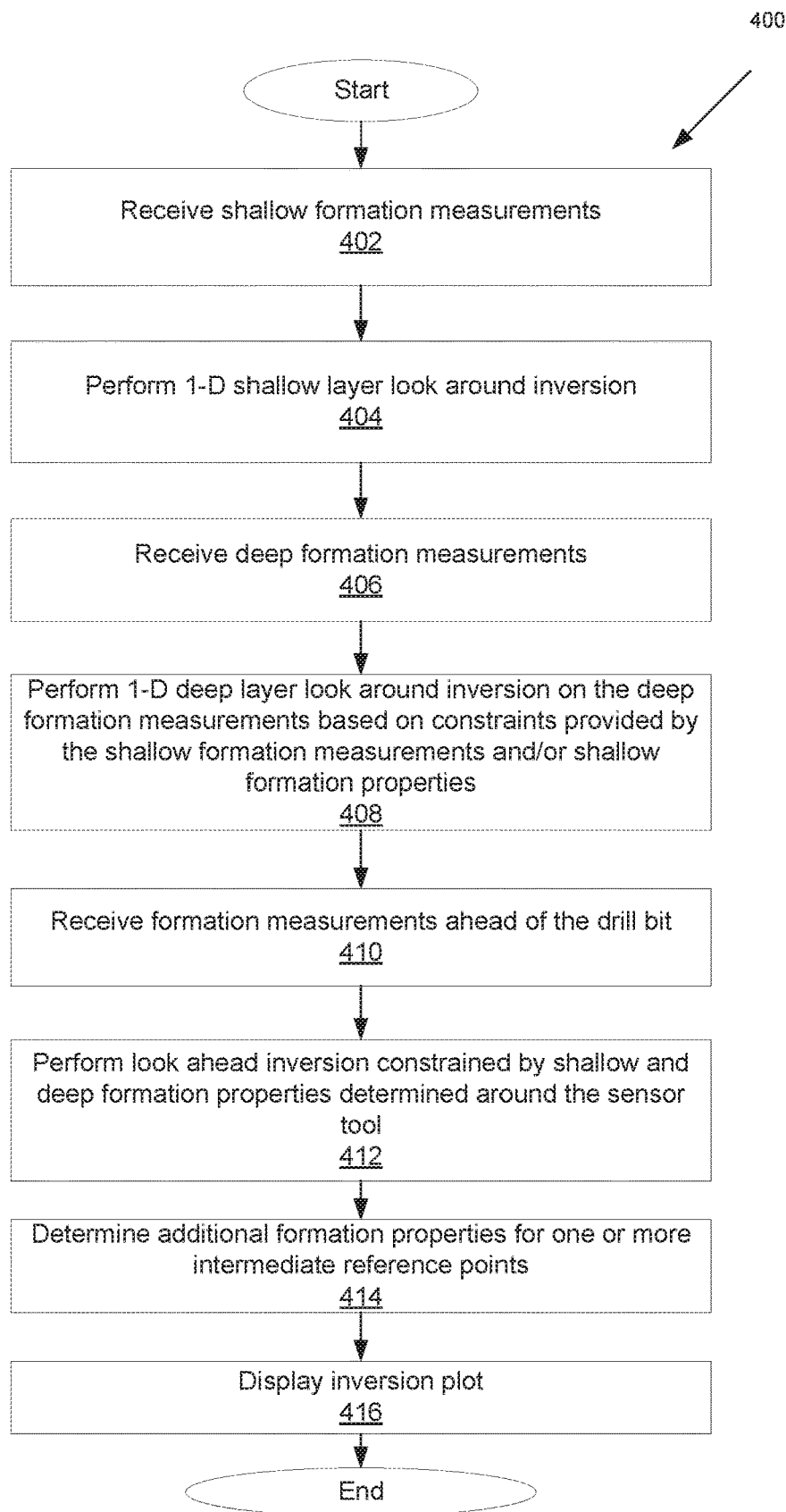
FIG. 4 is a flow chart of functions associated with determining the formation properties of a subsurface formation.

FIG. 4 is a flow chart of functions 400 associated with determining formation properties of a subsurface formation ahead of the drill bit. The functions 400 may be performed by the 1-D look ahead inversion unit of FIG. 1.

The formation properties that are determined may include one or more of horizontal and vertical resistivity, upper and lower formation boundaries, formation dip, and anisotropy but other formation properties may be determined with a tradeoff of more inversion uncertainty. Functions of the flow chart may be performed by the computing system and/or control unit based on measurements from the sensor string along the drill string. The sensor string may be arranged with one transmitter closest to the drill bit and one or more receiver spaced further away from the transmitter. The transmitters and/or receivers may take the form of coil antennas, but other arrangements are also possible.

At 402, shallow formation measurements may be received. A transmitter of a sensor string may be arranged to transmit electromagnetic signals, for example, in a range of 100 KHz to 2 MHz to a receiver spaced, for example, from 16 inches to 25 feet from the transmitter. The shallow formation measurements may be resistivity measurements with one or more of ZZ, XX, and YY sensitivity. The shallow formation measurements may be based on other component sensitivities as well.

At 404, a 1-D inversion may be performed on the shallow formation measurements to determine one or more shallow formation properties around a reference point as a function of depth (e.g., shallow layer look around inversion). The reference point may be at the transmitter of the transmitter/receiver pair. The depth may be a true vertical depth (TVD) associated with the reference point.

Figure 5:
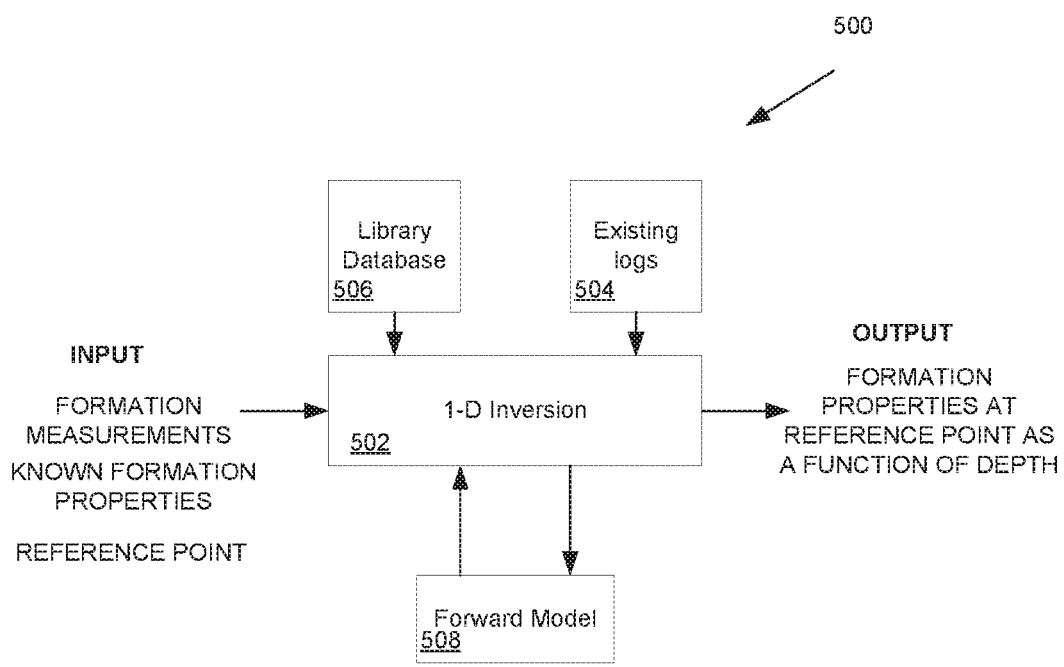
FIG. 5 is a block diagram illustrating operations associated with a 1-D inversion.

FIG. 5 is a block diagram of a generalized 1-D inversion process 500. The 1-D inversion 502 may receive an input one or more of formation measurements, an indication of a reference point in the formation, and/or known formation properties. Other inputs to the inversion process may include existing logs 504 such as formation resistivity logs, porosity logs, etc.

In the case of the 1-D inversion at 502, the inputs may include the shallow formation measurements and the reference point. The 1-D inversion 502 may include comparing the shallow formation measurements to measurements in a library 506. A closest match may indicate formation properties of the formation associated with the shallow formation measurements. The matching may be based on various schemes such as pattern matching.

Additionally, a forward model 508 may be used. The forward model may calculate expected measurements values with respect to an assumed model. Forward modeling 508 may involve determining what a given receiver would measure in a given formation by solving a set of theoretical equations representative of electromagnetic wave propagation through the formation as a function of depth. The shallow formation measurements may be compared to an output of the forward model and a difference is used to adjust the theoretical equations. Then, an output of the forward model is then compared again to the shallow formation measurements. This process is repeated until the output of forward model closely match the shallow formation measurements. The final forward model is an estimate of the formation properties, e.g., resistivity of the formation as a function of depth at the reference point.

Referring back to FIG. 4, at 406, deep formation measurements may be received. A transmitter of a sensor string may be arranged to transmit electromagnetic signals, for example, in a range of 500 Hz to 100 kHz to a receiver spaced, for example, from 50 feet to 300 feet from the transmitter. The deep formation measurements may be resistivity measurements associated with ZZ components and/or XZ and ZX components around the drill string. The deep formation measurements may be based on other components as well.

At 408, a 1-D inversion may be performed on the deep formation measurements based on constraints provided by the shallow formation measurements and/or shallow formation properties to determine one or more deep formation properties generally around the reference point as a function of depth as indicated by the 1-D inversion (e.g., deep layer look around inversion).

Specifically, knowledge of shallow formation measurements and/or shallow formation properties improve determination of the deep formation properties by reducing a number of unknowns in application of the forward model in determining the deep formation properties. In one example, the 1-D inversion process for the deep layer look around inversion may be constrained by using the shallow formation measurements as inputs in the inversion process. Input of the shallow formation measurements may reduce an uncertainty in the determination of the deep formation properties by the forward model, to improve inversion results. In another example, the 1-D inversion process for the deep layer look around inversion may be constrained by using the shallow formation properties as an initial guess for the deep layer formation properties and applying the forward model with the initial guess to invert the deep formation measurements. In yet another example, the shallow formation properties can be used as regularization item in the inversion process, such as using nonlinear Kalman filtering for regularized Gauss-Newton inversion. In another example, the 1-D inversion process for the deep layer look around inversion may be constrained by fixing the shallow formation properties and applying the forward model with the fixed shallow formation properties to invert the deep formation measurements. In this regard, the constraints reduce a number of variables in the inversion process by adding certainty to the determination of the deep formation properties at the reference point and improve stability and/or reduce ambiguity of the inversion.

At 410, the transmitter and a receiver may be arranged to provide deep formation measurements. The deep formation measurements may involve arranging the transmitter to transmit electromagnetic signals, for example, in a range of 500 Hz to 100 kHz and a receiver spaced, for example, from 50 feet to 300 feet from the transmitter to receive the signals. Unlike 406, the deep formation measurements may be resistivity measurements associated with XX or YY components or ZX and XZ components ahead of the drill bit among other components.

At 412, a 1-D inversion is performed for a reference point ahead of the reference point associated with the look around inversions. This reference point may be ahead of the transmitter in a direction of drilling (e.g., deeper in the formation) and in examples, the reference point ahead of the transmitter may also be ahead of the drill bit. The reference point ahead of the drill bit may be determined based on known distance between the reference point associated with the look around inversion and the drill bit and moving the reference point associated with the look around inversion to be ahead of the known distance. The deep formation measurements associated with XX or YY components or ZX and XZ components ahead of the drill bit may serve as an input into a 1-D inversion constrained by the shallow formation properties and deep formation properties determined around the sensor tool and any knowledge of formation properties ahead of the drill bit. The 1-D inversion may output formation properties at the reference point ahead of the drill bit as a function of depth.

At 414, additional formation properties may be determined for one or more intermediate reference points between the reference point associated with the look around inversion and the reference point ahead of the drill bit.

In one example, one or more inputs into the look ahead and/or look around inversion above may be weighed (e.g., interpolated) based on a depth of the reference point associated with the shallow and deep look around inversion ("look around depth"), a depth of the reference point ahead of the drill bit ("look ahead depth"), and/or a depth of a given intermediate reference point ("current depth"). The inputs into the shallow layer and deep layer look around inversions may be each weighted by:

$$A = (\text{lookahead depth} - \text{current depth})/(\text{lookahead depth} - \text{lookaround depth})$$

to form first weighted inputs while the inputs into the look ahead inversion may be weighted by:

$$B = (\text{current depth} - \text{lookaround depth})/(\text{lookahead depth} - \text{look around depth})$$

to form second weighted inputs, where look ahead depth is a measurement depth (MD) of the reference point ahead of the drill bit, look around depth is the MD of the reference point associated with the look around inversion, and current depth is a MD of the intermediate point; and where both A and B are in a range of 0 to 1.

The look around measurements may be weighted with the first weight A to the inversion at 404, 408 and the look ahead measurements may be weighted with the second weight B to the inversion at 412. By using the weighted look-around inversion inputs and the weighted look-ahead inversion inputs together, a weighted inversion may be performed at the intermediate point. This process may be repeated for various intermediate points ahead of the drill bit to determine the formation properties ahead of the drill bit.

In another example, one or more of the formation properties associated with one or more of the inversions at 404, 408, and 410 may be weighted (e.g., interpolated) to determine the formation properties at the intermediate reference point. The weighting may be mathematically represented as follows:

Inversion results at intermediate reference point=$C$*Lookaround inversion results+ $D$*Lookahead inversion results where:

Look around inversion results may be indicative of shallow formation properties or deep formation properties around the drill string;

Look ahead inversion results may be indicative for deep formation properties ahead of the drill bit;

$$C = (\text{lookahead depth} - \text{current depth})/(\text{lookahead depth} - \text{lookaround depth});$$

$$D = (\text{current depth} - \text{lookaround depth})/(\text{lookahead depth} - \text{look around depth}); \text{ and}$$

where both C and D are in a range of 0 to 1.

In some cases, the receiver may be arranged on the drill string to be closer to the drill bit than the transmitter. The above examples may be modified so that the reference point may be shifted ahead of the receiver instead of the transmitter.

At 416, the formation properties determined at all points may be combined to form an inversion canvas illustrating formation properties around and ahead of the drill bit based on the 1-D inversions. The inversion canvas may involve plotting the shallow layer formation properties and/or the deep layer formation properties determined via the 1-D inversion processes as a function of TVD and MD for the reference point associated with the look around inversions, the reference point ahead of the drill bit, and any intermediate reference points.

Figure 6:
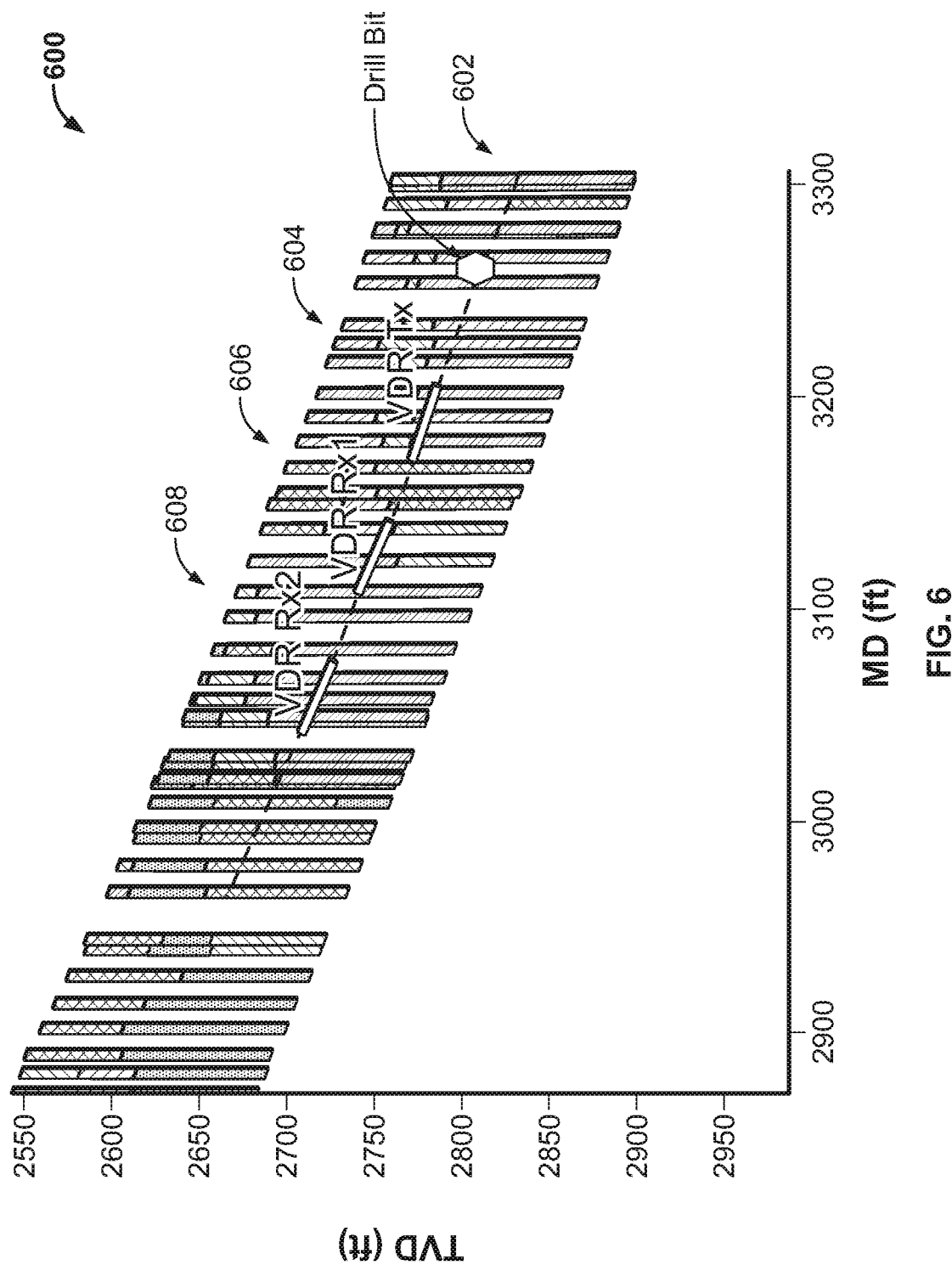
FIG. 6 is an example of an inversion canvas illustrating formation properties with respect to a drill bit.

FIG. 6 is an example of such an inversion canvas 600. A sensor string 602 may have one transmitter 604 and two receivers 606, 608 located behind the drill bit. The receiver 606 closest to the transmitter 604 may allow for performing shallow measurements with respect to the transmitter 604 while the receiver 608 further away from the transmitter 604 may allow for performing deep measurements with respect to the transmitter 604. The plot shows formation properties, e.g., horizontal and vertical resistivity, determined around the sensor string 602 and ahead of a drill bit as a function of TVD on a vertical axis and MD on a horizontal axis. For example, a given pattern (or alternatively a given color or gray level) at a given TVD/MD may indicate a given value of a formation property. The determination of formation properties may continue as the drill bit travels downhole and added to the inversion canvas. In this regard, the inversion canvas may dynamically be updated as the formation is drilled.

The inversion canvas can be used to make steering decisions in the subsurface formation. Steering is an intentional control of a direction of drilling by a drill bit. The resistivity at layers may be indicative of oil, gas, and oil water contact ahead of the drill bit. The drill bit may be steered based on these indications to maximize hydrocarbon production in the subsurface formation. For example, if the resistivity ahead of the bit indicates presence of hydrocarbons, then the drill bit may be steered in that direction while if the resistivity ahead of the bit indicates presence of water, then the drill bit may be steered in another direction.

In some examples, formation properties may be determined in a wellbore by placing a sampling tool on a wireline downhole to determine formation properties ahead of the wellbore rather than on a drill string.

Figure 7:
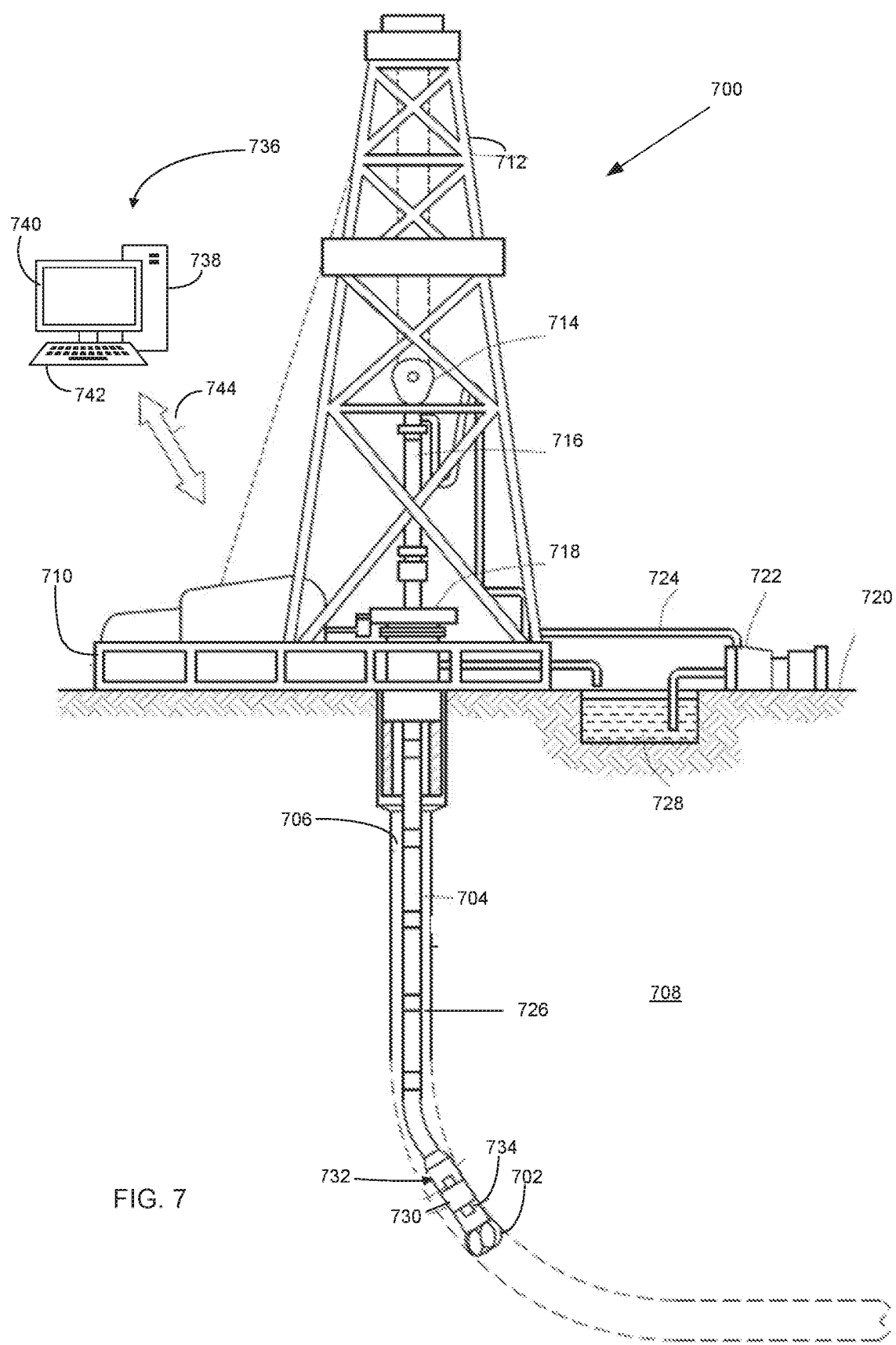
FIG. 7 is a schematic diagram of well apparatus.

FIG. 7 is a schematic diagram of well apparatus 700 in which above the functions may be performed. The well apparatus 700 includes a drill bit 702 disposed on a drill string 704 of the well apparatus 700 for drilling a wellbore 706 in a subsurface formation 708. While wellbore 706 is shown extending generally vertically into the subsurface formation 708, the principles described herein are also applicable to wellbores that extend at an angle through the subsurface formation 708, such as horizontal and slanted wellbores. For example, the wellbore can be angled vertically followed by a low inclination angle, high inclination angle or horizontal placement of the well. It should further be noted that a land-based operation is depicted, but those skilled in the art will readily recognize that the principles described herein are equally applicable to subsea operations that employ floating or sea-based platforms and rigs, without departing from the scope of the disclosure.

The well apparatus 700 may further includes a drilling platform 710 that supports a derrick 712 having a traveling block 714 for raising and lowering drill string 704. Drill string 704 may include, but is not limited to, drill pipe and coiled tubing, as generally known to those skilled in the art. A kelly 716 may support drill string 704 as it may be lowered through a rotary table 718. The drill bit 702 may crush or cut rock, be attached to the distal end of drill string 704 and be driven either be a downhole motor and/or via rotation of drill string 704 from the surface 720. Without limitation, drill bit 702 may include, roller cone bits, PDC bits, natural diamond bits, any hole openers, reamers, coring bits, and the like. As drill bit 702 rotates, it may create and extend wellbore 706 that penetrates various subterranean formations. A pump 722 may circulate drilling fluid through a feed pipe 724 to kelly 716, downhole through interior of drill string 704, through orifices in drill bit 702, back to surface 720 via annulus 726 surrounding drill string 704, and into a retention pit 728.

Drill bit 702 may be just one piece of the drill string 704 that may include one or more drill collars 730 and one or more sampling tools 732. The sampling tool 732 may contain one or a plurality of logging tools 734 such as logging-while-drilling (LWD) or measuring-while-drilling (MWD) tools for measuring, processing, and storing information. It will also be understood that more than one sampling tool 732 (i.e., one or more LWD and/or MWD module) can be employed. Sampling tool 732 may be arranged to communicate with a computing system 736. Computing system 736 may include a processing unit 738, a monitor 740, an input device 742 (e.g., keyboard, mouse, etc.), and/or computer media (e.g., optical disks, magnetic disks) that can store code representative of the methods described herein. Computing system 736 may act as a data acquisition system and possibly a data processing system that analyzes information from sampling tool 732. Any suitable technique may be used for transmitting signals from sampling tool 732 to the computing system 736 residing on the surface 720. As illustrated, a communication link 744 (which may be wired or wireless, for example) may be provided that may transmit data from sampling tool 732 to the computing system 736. Communication link 744 may implement one or more of various known drilling telemetry techniques such as mud-pulse, acoustic, electromagnetic, etc.

Figure 8:
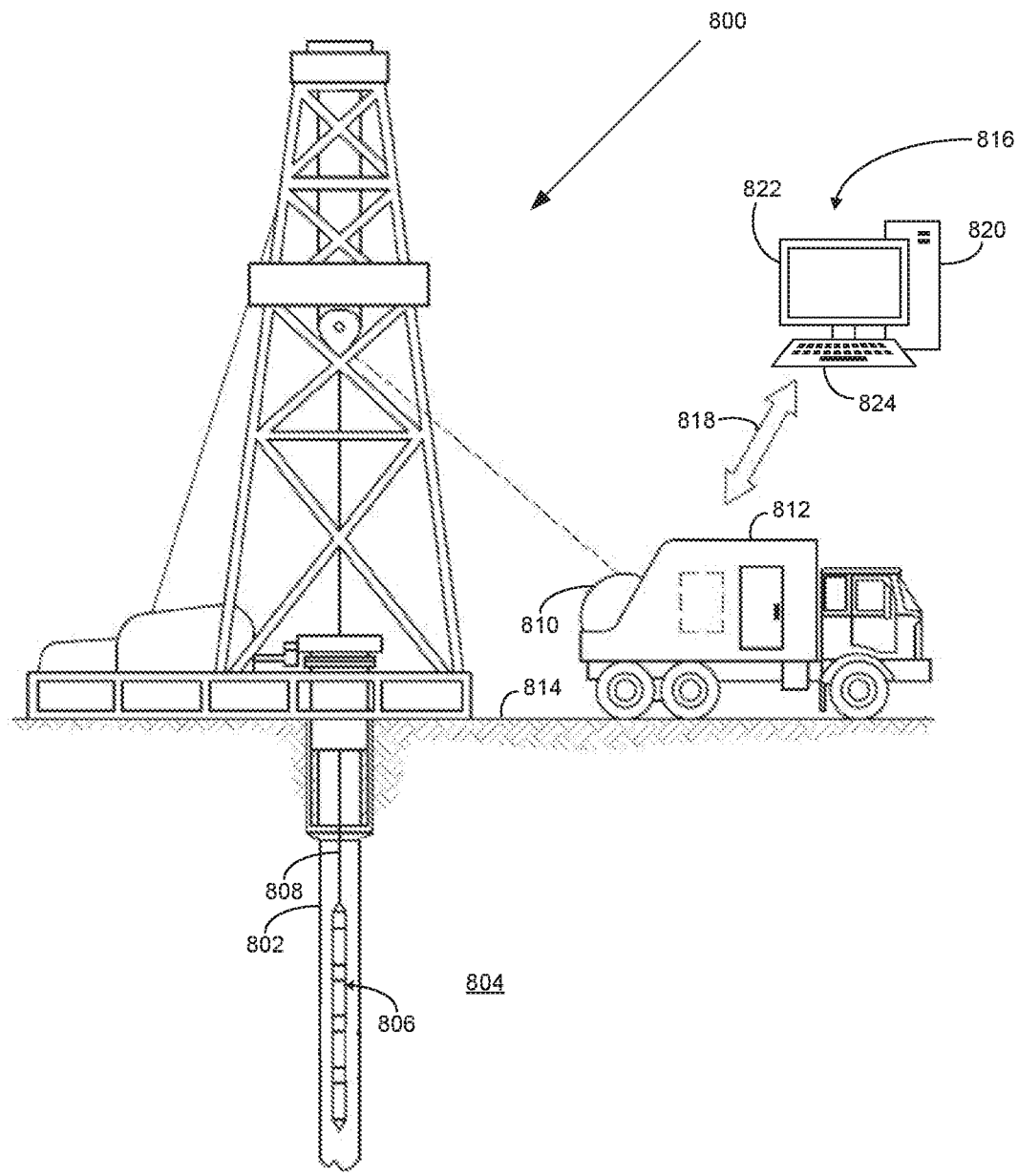
FIG. 8 is schematic diagram of another well apparatus.

FIG. 8 is a schematic diagram of another well apparatus 800 in which the above functions may be performed. A wellbore 802 may extend through subterranean formation 804. Downhole sampling tool 806 may be similar in configuration and operation to downhole sampling tool 732 shown on FIG. 7 except that FIG. 8 shows sampling tool 804 disposed on wireline 808. It should be noted that while FIG. 8 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 810 may be used to run sampling tool 806 into wellbore 802. Hoist 810 may be disposed on a recovery vehicle 812. Hoist 810 may be used, for example, to raise and lower wireline 808 in wellbore 802. While hoist 810 is shown on recovery vehicle 812, it should be understood that wireline 808 may alternatively be disposed from a hoist 810 that is installed at surface 814 instead of being located on recovery vehicle 812. Sampling tool 806 may be suspended in wellbore 802 on wireline 808. Other conveyance types may be used for conveying sampling tool 808 into wellbore 802, including coiled tubing, wired drill pipe, slickline, and downhole tractor, for example. Sampling tool 806 may contain one or a plurality of logging tools for measuring, processing, and storing information associated with the formation around the sampling tool and ahead of the sampling tool.

As previously described, information from sampling tool 806 may be transmitted to a computing system 816, which may be located at surface 814. As illustrated, communication link 818 (which may be wired or wireless, for example) may be provided that may transmit data from sampling tool 806 to an information handling system 816 at surface 814. Information handling system 816 may include a processing unit 820, a monitor 822, an input device 824 (e.g., keyboard, mouse, etc.), and/or computer media (e.g., optical disks, magnetic disks) that can store code representative of the methods described herein. In addition to, or in place of processing at surface 814, processing may occur downhole.

Figure 9:
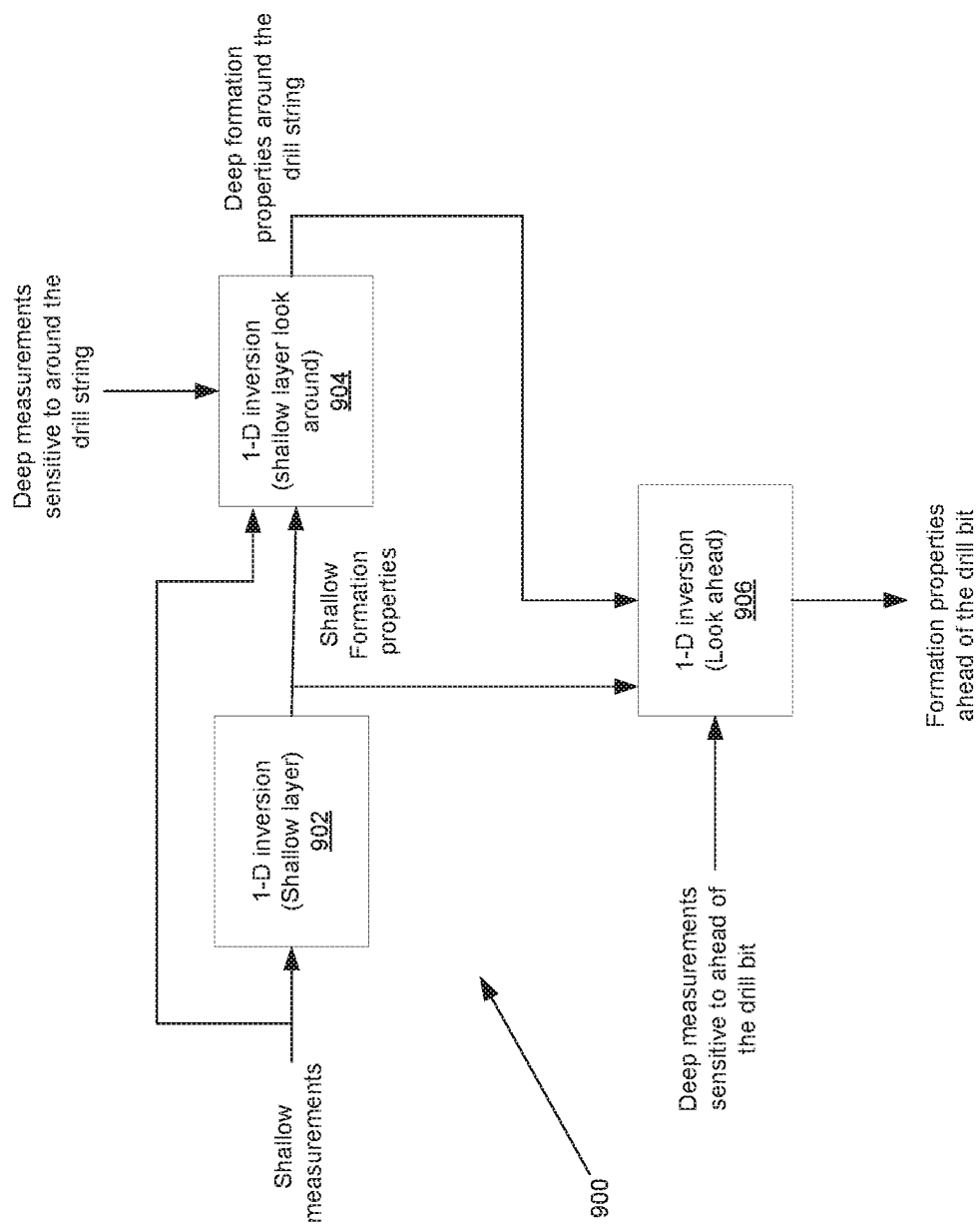
FIG. 9 is a block diagram illustrating a sequence of 1-D inversions associated with determining formation properties ahead of the drill bit.

FIG. 9 is a simplified block diagram 900 which illustrates the 1-D inversion processes described in FIG. 4 and performed by the 1-D look ahead inversion unit in FIG. 1. 1-D inversion 902 may receive shallow measurements as an input and perform a 1-D inversion to determine shallow formation properties as a function of depth at a reference point. 1-D look around inversion 904 may receive as inputs deep measurements sensitive to around the drill string and the shallow formation properties and/or shallow measurements as constraints and determine deep formation properties around the drill string as a function of depth at the reference point. A 1-D inversion 906 may then receive as inputs deep measurements sensitive to ahead of a drill bit and the deep formation properties around the drill string and/or shallow formation properties as constraints to determine formation properties for a reference point ahead of the drill bit as a function of depth. In this regard formation properties can be determined ahead of a drill based on the sequence of 1-D inversions and without having to perform a 2-D inversion based on the measurements sensitive to around the drill string and ahead of the drill bit which may be computationally complex.

Figure 10:
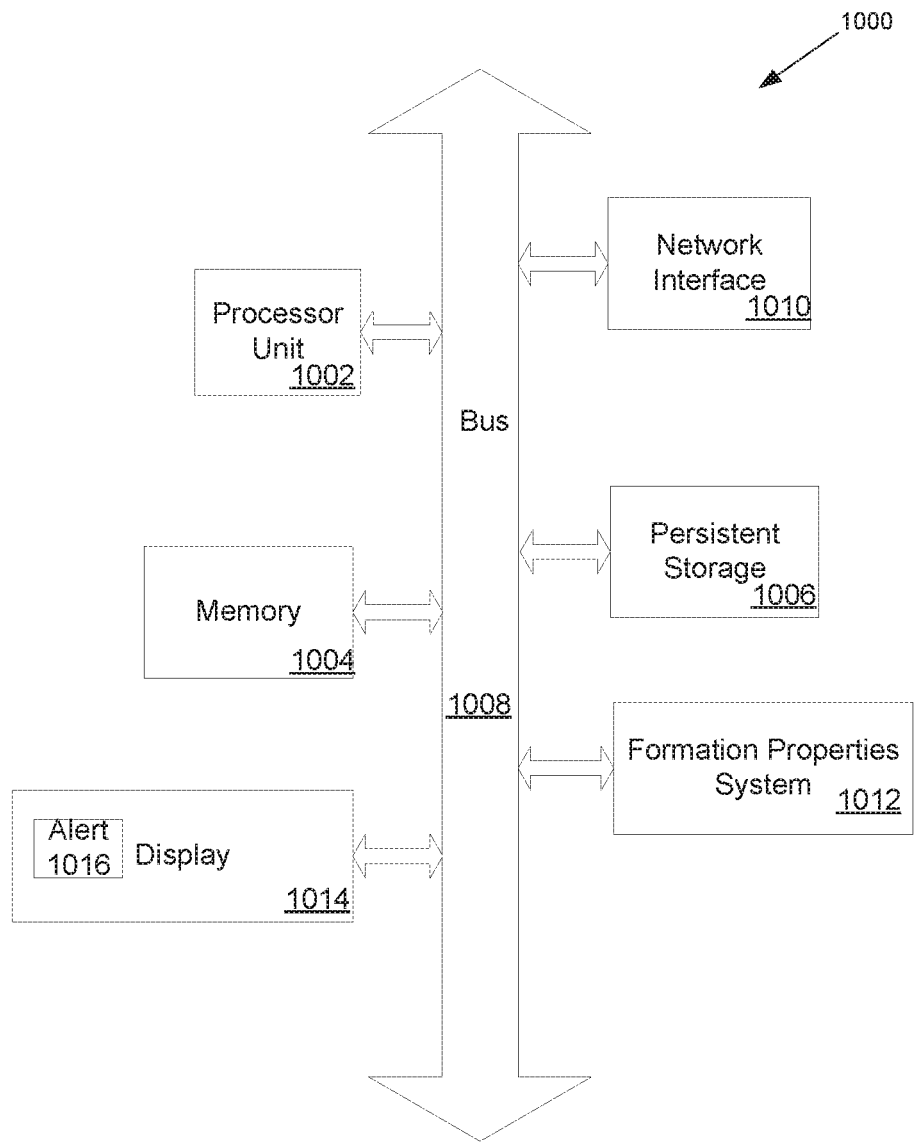
FIG. 10 is a block diagram of apparatus for determining formation properties ahead of the drill bit.

FIG. 10 is a block diagram of apparatus 1000 (e.g., the computing system and/or control unit) for determining formation properties ahead of a drill bit as described above using a 1-D inversion process. The apparatus 1000 may be located at a surface of a formation or downhole. In the case that the apparatus 1000 is downhole, the apparatus 1000 may be rugged, unobtrusive, can withstand the temperatures and pressures in situ at the wellbore.

The apparatus 1000 includes a processor 1002 (possibly including multiple processors, multiple cores, multiple nodes, and/or implementing multi-threading, etc.). The apparatus 1000 includes memory 1004. The memory 1004 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The apparatus 1000 may also include a persistent data storage 1006. The persistent data storage 1006 can be a hard disk drive, such as magnetic storage device. The computer device also includes a bus 1008 (e.g., PCI, ISA, PCI-Express, HyperTransport® bus, InfiniBand® bus, NuBus, etc.) and a network interface 1010 in communication with the sensor tool. The apparatus 1000 may have a formation properties system 1012 to determine formation properties ahead of a drill bit in the subsurface formation using the 1-D inversions as described above.

Further, the apparatus 1000 may further comprise a display 1014. The display 1014 may comprise a computer screen or other visual device. The display 1014 may show the formation properties determined by the formation properties module 1012 such as the inversion canvas. Additionally, the display 1014 may convey alerts 1016. The formation processing module 1012 may generate the alerts 1016 relating to formation properties that may be rendered on the display 1014 such as the drill bit approaching a gas or oil formation. The alerts 1016 may be visual in nature but they may also comprise audible alerts output by an audio output device (e.g., speaker).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 402-416 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for formation properties ahead of a drill bit as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: receiving one or more first formation measurements associated with a region around a drill string, the drill string deployed in a subsurface formation; performing a 1-D inversion of the one or more first formation measurements at a first reference point behind a drill bit of the drill string; receiving one or more second formation measurements associated with a region ahead of the drill bit; and performing a 1-D inversion of the second formation measurements at a second reference point to determine formation properties ahead of the drill bit, wherein the second reference point is ahead of the first reference point and the drill bit in a drilling direction; and wherein the 1-D inversion of the second formation measurements is based on inversion results associated with the 1-D inversion of the first formation measurements at the first reference point.

Embodiment 2: The method of Embodiment 1, further comprising steering the drill bit of the drill string based on the determined formation properties ahead of the drill bit.

Embodiment 3: The method of Embodiment 1 or 2, wherein the first formation measurements comprise shallow formation measurements provided by a transmitter and a first receiver separated by a first distance and deep formation measurements associated with the region around the drill string provided by the transmitter and a second receiver separated by a second distance, wherein the first distance is less than the second distance; and wherein performing the 1-D inversion of the first formation measurements comprises performing a 1-D inversion of the shallow formation measurements to determine shallow formation properties and performing a 1-D inversion of the deep formation measurements to determine deep formation properties around the drill string based on the shallow formation properties.

Embodiment 4: The method of any of Embodiments 1-3, further comprising weighting the one or more first formation measurements and second formation measurements to determine formation properties at an intermediate point in between the first reference point and second reference point.

Embodiment 5: The method of any of Embodiments 1-4, further comprising weighting the inversion results associated with the 1-D inversion of the first formation measurements and the formation properties ahead of the drill bit to determine formation properties at an intermediate point in between the first reference point and the second reference point.

Embodiment 6: The method of any of Embodiments 1-5, further comprising displaying the formation properties ahead of the drill bit on a display screen, wherein the formation properties ahead of the drill bit comprise a resistivity of the formation ahead of the drill bit as a function of depth.

Embodiment 7: The method of any of Embodiments 1-6, wherein receiving one or more first formation measurements comprising receiving the one or more first formation measurements based on at least one transmitter with a first antenna coaxial to the drill string transmitting an electromagnetic wave to at least one receiver arranged with a second antenna coaxial to the drill string.

Embodiment 8: The method of any of Embodiments 1-7, wherein receiving one or more second formation measurements comprising receiving the one or more second formation measurements based on at least one transmitter with a first antenna axial to the drill string transmitting an electromagnetic wave to at least one receiver arranged with a second antenna axial to the drill string.

Embodiment 9: A system comprising: a drill string deployed in a subsurface formation comprising at least one transmitter, at least one receiver, and a drill bit; a processor; and a non-transitory machine readable medium having program code executable by the processor to cause the processor to: receive, from the logging tool, one or more first formation measurements associated with a region around the drill string; perform a 1-D inversion of the one or more first formation measurements at a first reference point behind the drill bit; receive one or more second formation associated with a region ahead of the drill bit; and perform a 1-D inversion of the second formation measurements at a second reference point to determine formation properties ahead of the drill bit, wherein the second reference point is ahead of the first reference point and the drill bit in a drilling direction; and wherein the 1-D inversion of the second formation measurements is based on inversion results associated with the 1-D inversion of the first formation measurements at the first reference point.

Embodiment 10: The system of Embodiment 9, further comprising a display screen and program code to display the formation properties ahead of the drill bit on the display screen, wherein the formation properties comprises a resistivity of the formation ahead of the drill bit as a function of depth.

Embodiment 11: The system of Embodiment 9 or 10, further comprising program code to steer the drill bit of the drill string based on the formation properties ahead of the drill bit.

Embodiment 12: The system of any of Embodiments 9-11, wherein the first formation measurements comprise shallow formation measurements provided by a transmitter and a first receiver separated by a first distance and deep formation measurements associated with the region around the drill string provided by the transmitter and a second receiver separated by a second distance, wherein the first distance is less than the second distance; and wherein the program code to perform the 1-D inversion of the first formation measurements comprises program code to perform a 1-D inversion of the shallow formation measurements to determine shallow formation properties and program code to perform a 1-D inversion of the deep formation measurements to determine deep formation properties around the drill string based on the shallow formation properties.

Embodiment 13: The system of any of Embodiments 9-12, wherein the first formation measurements are based on at least one transmitter with a first antenna coaxial to the drill string transmitting an electromagnetic wave to at least one receiver arranged with a second antenna coaxial to the drill string.

Embodiment 14: The system of any of Embodiments 9-13, wherein the second formation measurements are based on at least one transmitter with a first antenna axial to the drill string transmitting an electromagnetic wave to at least one receiver arranged with a second antenna axial to the drill string.

Embodiment 15: The system of any of Embodiments 9-14, wherein the second formation measurements are based on at least one transmitter with a first antenna coaxial to the drill string transmitting an electromagnetic wave to at least one receiver arranged with a second antenna axial to the drill string.

Embodiment 16: One or more non-transitory machine-readable media comprising program code, the program code to: receive one or more first formation measurements associated with a region around a drill string, the drill string deployed in a subsurface formation; perform a 1-D inversion of the one or more first formation measurements at a first reference point behind a drill bit of the drill string; receive one or more second formation measurements associated with a region ahead of the drill bit of the drill string; and perform a 1-D inversion of the second formation measurements at a second reference point to determine formation properties ahead of the drill bit, wherein the second reference point is ahead of the first reference point and the drill bit in a drilling direction; and wherein the 1-D inversion of the second formation measurements is based on inversion results associated with the 1-D inversion of the first formation measurements at the first reference point.

Embodiment 17: The one or more non-transitory machine-readable media of Embodiment 16, wherein the first formation measurements comprise shallow formation measurements provided by a transmitter and a first receiver separated by a first distance and deep formation measurements associated with the region around the drill string provided by the transmitter and a second receiver separated by a second distance, wherein the first distance is less than the second distance; and wherein the program code to perform the 1-D inversion of the first formation measurements comprises program code to perform a 1-D inversion of the shallow formation measurements to determine shallow formation properties and program code to perform a 1-D inversion of the deep formation measurements to determine deep formation properties around the drill string based on the shallow formation properties.

Embodiment 18: The one or more non-transitory machine-readable media of Embodiment 16 or 17, further comprising program code to steer the drill bit of the drill string based on the determined formation properties ahead of the drill bit.

Embodiment 19: The one or more non-transitory machine-readable media of any of Embodiments 16-18, wherein the formation properties ahead of the drill bit comprise resistivity of the formation ahead of the drill bit as a function of depth.

Embodiment 20: The one or more non-transitory machine-readable media of any of Embodiments 16-19, wherein the first reference point is at a transmitter on the drill string.

What is claimed is:

1. A method for determining formation properties ahead of a drill bit in a subsurface formation, the method comprising:
    penetrating the subsurface formation with the drill bit of a drill string, wherein the drill string comprises a logging tool with at least one transmitter and at least one receiver;
    transmitting, by the at least one transmitter, signals, wherein the at least one receiver receives the signals;
    obtaining, from the logging tool, one or more first formation measurements associated with a region around the drill string, wherein the one or more first formation measurements are based, at least in part, on the signals;
    performing, with a 1-D look ahead inversion unit, a 1-D inversion of the one or more first formation measurements at a first reference point behind the drill bit;
    obtaining, from the logging tool, one or more second formation measurements associated with a region ahead of the drill bit, wherein the one or more second formation measurements are based, at least in part, on the signals;
    performing, with the 1-D look ahead inversion unit, a 1-D inversion of the one or more second formation measurements at a second reference point to determine the formation properties ahead of the drill bit, wherein the second reference point is ahead of the first reference point and the drill bit in a drilling direction, wherein the 1-D inversion of the one or more second formation measurements is based on inversion results associated with the 1-D inversion of the one or more first formation measurements at the first reference point; and
    steering the drill bit of the drill string based on the formation properties ahead of the drill bit.

2. The method of claim 1, wherein the one or more first formation measurements comprise shallow formation measurements provided by a first transmitter of the at least one transmitter and a first receiver of the at least one receiver separated by a first distance, and deep formation measurements associated with the region around the drill string provided by the first transmitter and a second receiver separated by a second distance,
    wherein the first distance is less than the second distance; and
    wherein performing the 1-D inversion of the one or more first formation measurements comprises performing a 1-D inversion of the shallow formation measurements to determine shallow formation properties, and performing a 1-D inversion of the deep formation measurements to determine deep formation properties around the drill string based on the shallow formation properties.

3. The method of claim 1, further comprising weighting the one or more first formation measurements and the one or more second formation measurements to determine formation properties at an intermediate point in between the first reference point and the second reference point.

4. The method of claim 1, further comprising weighting inversion results associated with the 1-D inversion of the one or more first formation measurements and the formation properties ahead of the drill bit to determine formation properties at an intermediate point in between the first reference point and the second reference point.

5. The method of claim 1, further comprising displaying the formation properties ahead of the drill bit on a display screen, wherein the formation properties ahead of the drill bit comprise a resistivity of the subsurface formation ahead of the drill bit as a function of depth.

6. The method of claim 1, wherein receiving the one or more first formation measurements comprises receiving the one or more first formation measurements based on the at least one transmitter with a first antenna coaxial to the drill string transmitting an electromagnetic wave to the at least one receiver arranged with a second antenna coaxial to the drill string.

7. The method of claim 1, wherein receiving the one or more second formation measurements comprises receiving the one or more second formation measurements based on the at least one transmitter with a first antenna axial to the drill string transmitting an electromagnetic wave to the at least one receiver arranged with a second antenna axial to the drill string.

8. A system comprising:
    a drill string deployed downhole in a subsurface formation, the drill string comprising a drill bit and a logging tool with at least one transmitter and at least one receiver, wherein the at least one transmitter transmits signals, and wherein the at least one receiver receives the signals;
    a processor; and
    a non-transitory machine readable medium having program code executable by the processor to cause the processor to:
        obtain, from the logging tool, one or more first formation measurements associated with a region around the drill string, wherein the one or more first formation measurements are based, at least in part, on the signals;
        perform, with a 1-D look ahead inversion unit, a 1-D inversion of the one or more first formation measurements at a first reference point behind the drill bit;
        obtain, from the logging tool, one or more second formation measurements associated with a region ahead of the drill bit, wherein the one or more second formation measurements are based, at least in part, on the signals; and perform, with the 1-D look ahead inversion unit, a 1-D inversion of the one or more second formation measurements at a second reference point to determine formation properties ahead of the drill bit, wherein the second reference point is ahead of the first reference point and the drill bit in a drilling direction, wherein the 1-D inversion of the one or more second formation measurements is based on inversion results associated with the 1-D inversion of the one or more first formation measurements at the first reference point; and steer the drill bit of the drill string based on the formation properties ahead of the drill bit.

9. The system of claim 8, further comprising a display screen and program code to display the formation properties ahead of the drill bit on the display screen, wherein the formation properties comprise a resistivity of the subsurface formation ahead of the drill bit as a function of depth.

10. The system of claim 8, wherein the one or more first formation measurements comprise shallow formation measurements provided by a first transmitter of the at least one transmitter and a first receiver of the at least one receiver separated by a first distance, and deep formation measurements associated with the region around the drill string provided by the first transmitter and a second receiver of the at least one receiver separated by a second distance, wherein the first distance is less than the second distance; and wherein the program code to perform the 1-D inversion of the one or more first formation measurements comprises program code to perform a 1-D inversion of the shallow formation measurements to determine shallow formation properties, and program code to perform a 1-D inversion of the deep formation measurements to determine deep formation properties around the drill string based on the shallow formation properties.

11. The system of claim 8, wherein the one or more first formation measurements are based on the at least one transmitter with a first antenna coaxial to the drill string transmitting an electromagnetic wave to the at least one receiver arranged with a second antenna coaxial to the drill string.

12. The system of claim 8, wherein the one or more second formation measurements are based on the at least one transmitter with a first antenna axial to the drill string transmitting an electromagnetic wave to the at least one receiver arranged with a second antenna axial to the drill string.

13. The system of claim 8, wherein the one or more second formation measurements are based on the at least one transmitter with a first antenna coaxial to the drill string transmitting an electromagnetic wave to the at least one receiver arranged with a second antenna axial to the drill string.

14. One or more non-transitory machine-readable media comprising program code, the program code to:

obtain, from a logging tool, one or more first formation measurements associated with a region around a drill string that is penetrating a subsurface formation with a drill bit, the drill string comprising the logging tool with at least one transmitter and at least one receiver, wherein the at least one transmitter transmits signals and the at least one receiver receives the signals, and wherein the one or more first formation measurements are based, at least in part, on the signals;

perform, with a 1-D look ahead inversion unit, a 1-D inversion of the one or more first formation measurements at a first reference point behind the drill bit;

obtain, from the logging tool, one or more second formation measurements associated with a region ahead of the drill bit, wherein the one or more second formation measurements are based, at least in part, on the signals;

perform, with the 1-D look ahead inversion unit, a 1-D inversion of the one or more second formation measurements at a second reference point to determine formation properties ahead of the drill bit, wherein the second reference point is ahead of the first reference point and the drill bit in a drilling direction, wherein the 1-D inversion of the one or more second formation measurements is based on inversion results associated with the 1-D inversion of the one or more first formation measurements at the first reference point; and steer the drill bit of the drill string based on the formation properties ahead of the drill bit.

15. The one or more non-transitory machine-readable media of claim 14, wherein the one or more first formation measurements comprise shallow formation measurements provided by a first transmitter of the at least one transmitter and a first receiver of the at least one receiver separated by a first distance, and deep formation measurements associated with the region around the drill string provided by the first transmitter and a second receiver of the at least one receiver separated by a second distance, wherein the first distance is less than the second distance; and wherein the program code to perform the 1-D inversion of the one or more first formation measurements comprises program code to perform a 1-D inversion of the shallow formation measurements to determine shallow formation properties, and program code to perform a 1-D inversion of the deep formation measurements to determine deep formation properties around the drill string based on the shallow formation properties.

16. The one or more non-transitory machine-readable media of claim 14, wherein the formation properties ahead of the drill bit comprise resistivity of the subsurface formation ahead of the drill bit as a function of depth.

17. The one or more non-transitory machine-readable media of claim 14, wherein the first reference point is at a transmitter on the drill string.

* * * * *